Oct. 31, 1961  J. J. COOGAN  3,006,420
CULTIVATOR ATTACHMENT FOR TRACTORS
Filed Sept. 3, 1958  3 Sheets-Sheet 3
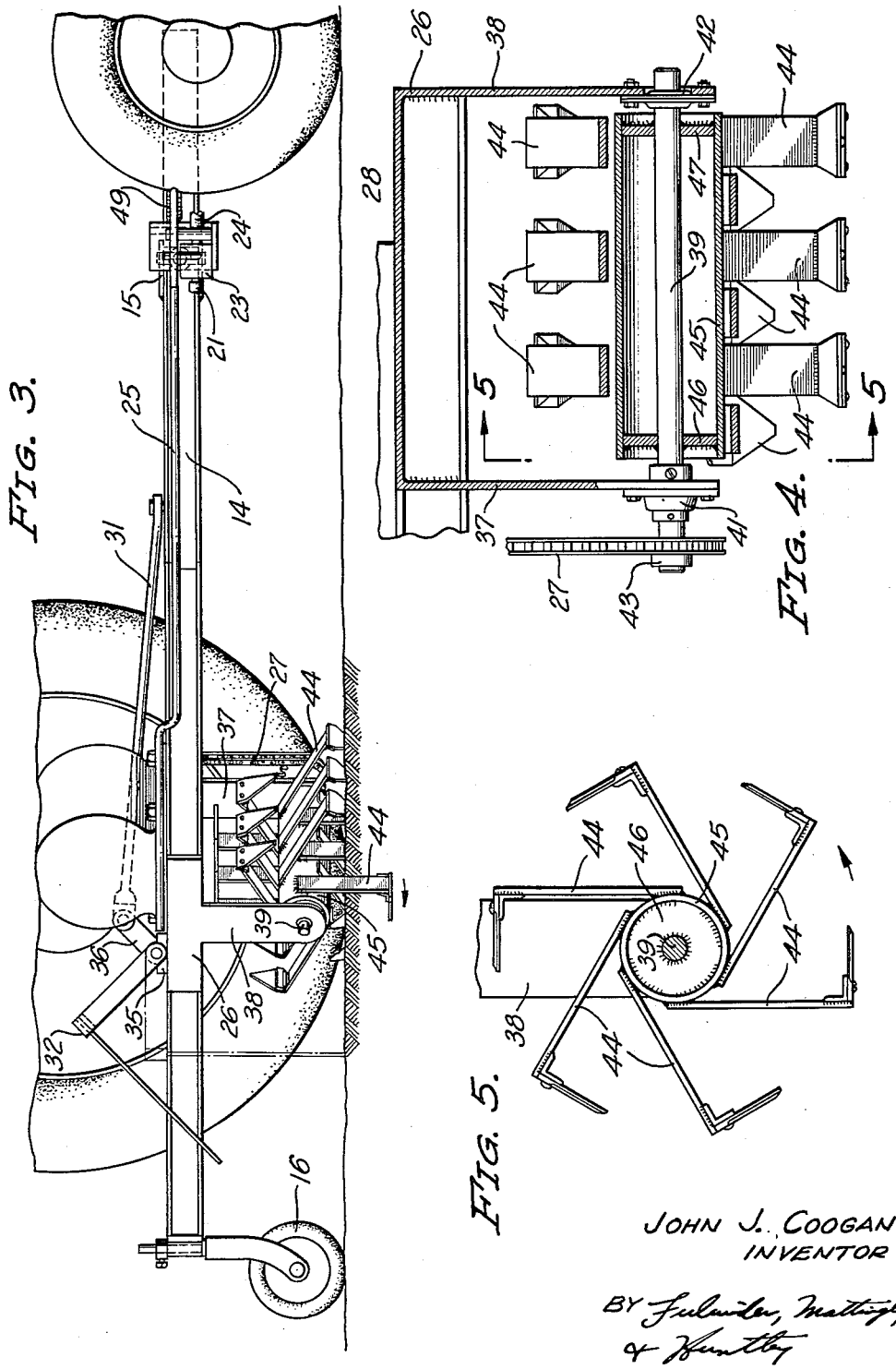
JOHN J. COOGAN
INVENTOR
BY
ATTORNEYS

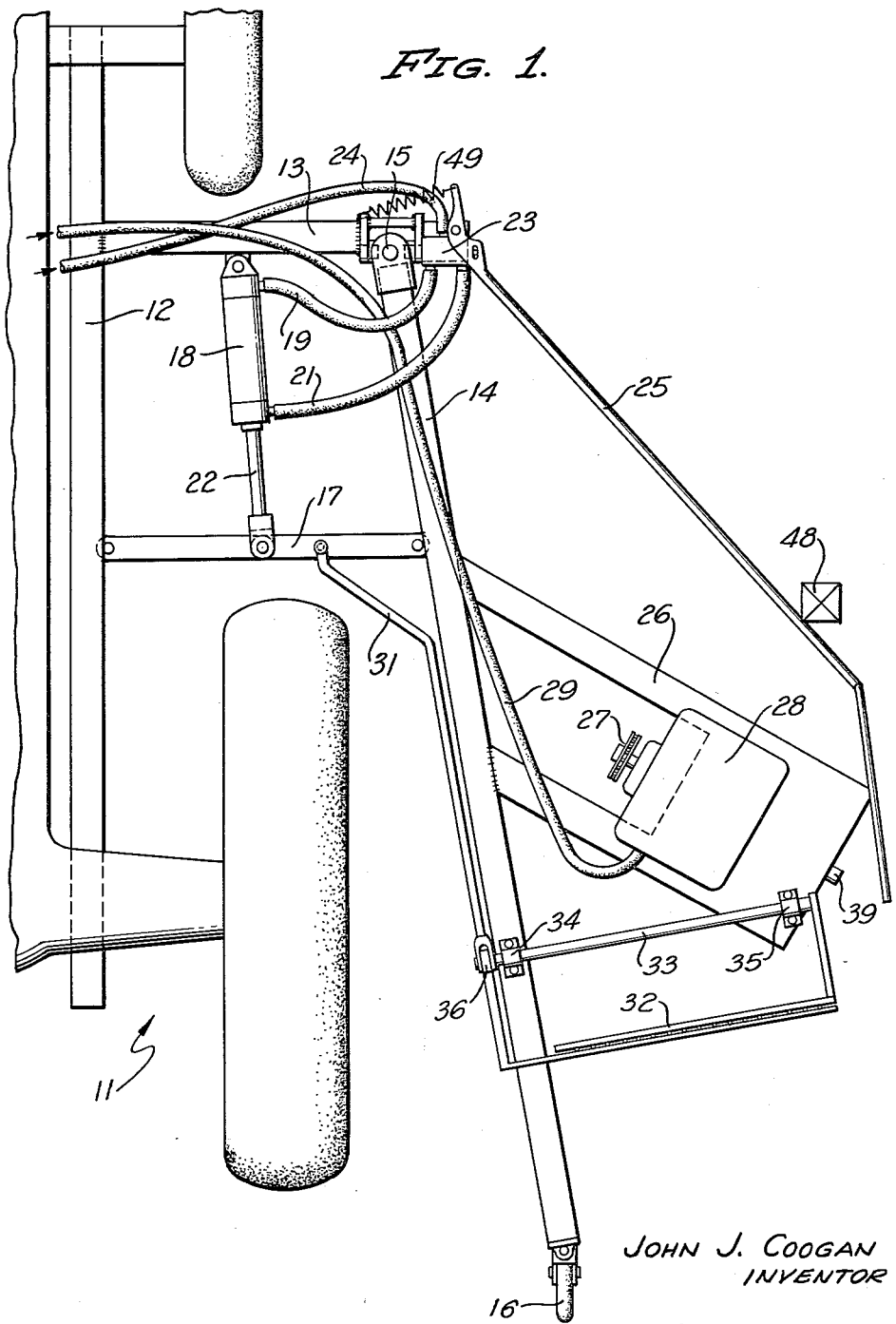

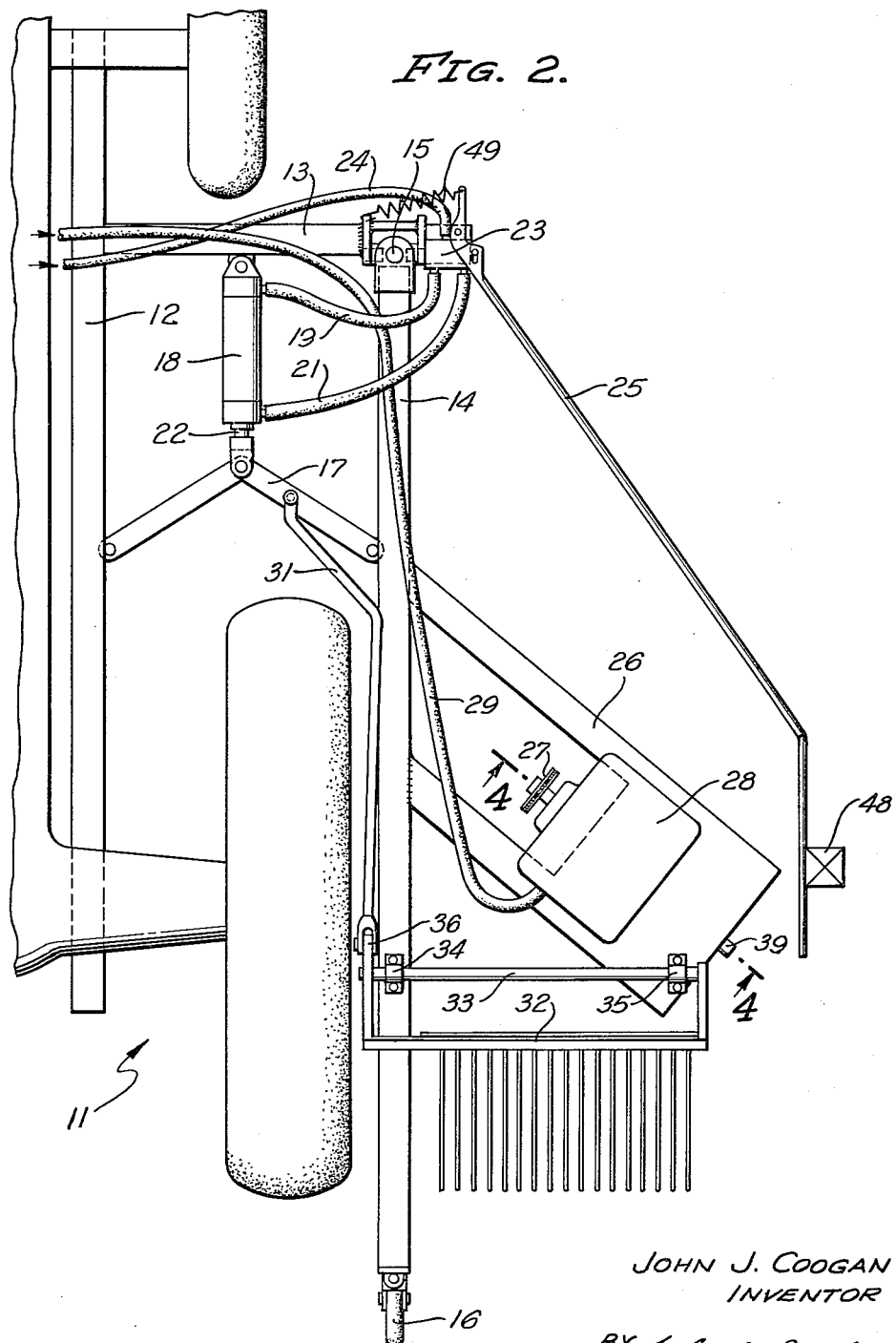

United States Patent Office 3,006,420
Patented Oct. 31, 1961

3,006,420
CULTIVATOR ATTACHMENT FOR TRACTORS
John J. Coogan, 6045 Mission Blvd., Riverside, Calif.
Filed Sept. 3, 1958, Ser. No. 758,835
6 Claims. (Cl. 172—5)

This invention relates to agricultural implements and more particularly to a cultivator attachment for tractors which is adapted to cut and pull up the weeds and devil grass and pulverize the ground between and around and in close proximity to plants and trees which are planted in straight spaced rows, such as the grape plants in vineyards.

There have been many devices proposed for cultivating various crops between the rows of plants or trees, however, these devices had to be operated by steering in and around the plants in order to cultivate the ground between the plants and avoid injury to the tree or plants when in close proximity thereto, otherwise damage to the plants would result or the ground between the plants would not be properly cultivated. Operation in this manner requires an experienced operator with great skill in maneuvering the tractor and cultivator in the proper manner.

The present invention in one of its preferred embodiments consists essentially of a cultivator attachment for tractors which is mounted outboard of the wheels on one side thereof and extending from a frame which may be suitably attached to the tractor frame or axles. A cultivator consisting of a plurality of hoes rotating in a forward direction is mounted on a pivoted arm which extends rearwardly from a cantilever bracket and is actuated by a toggle joint and fluid piston preferably an air piston to provide adequate speed of response when a suitable air valve is actuated by a lever extending outwardly of the cultivator and adapted to engage the grape stake supporting a grape vine or other portions of a tree or bush. Another lever is connected to the toggle joint for operating a dump rake which follows the cultivator to collect the loose weeds and grass so that such debris is dumped each time the cultivator passes a grape vine, tree or other plant.

One object of the present invention is to provide a cultivator attachment for tractors which is adapted to cultivate between spaced plants or trees in a row and automatically retract to a position which will avoid the plants or trees when in close proximity thereto and then return to its original position.

Another object of the present invention is to provide a cultivator attachment for tractors which is adapted to automatically cultivate between and around adjacent plants or trees in a row and after cutting up and pulling the weeds and devil grass to rake up such debris and automatically dump at periodic intervals as it is passing a plant or tree.

A still further object of the present invention is to provide an improved cultivator attachment for tractors which will cultivate and remove weeds and devil grass from between and around plants such as grape vines in a vineyard and at the same time rake up and automatically dump the debris at pre-determined intervals when the cultivator is moved inwardly to pass around the vine.

Other objects and advantages of the present invention will be apparent from the following description and drawings wherein:

FIGURE 1 is a top plan view of one preferred embodiment of the present invention showing a portion of the tractor to which it is adapted to be attached and illustrating the cultivator in its outward position after it has contacted a grape stake for actuating the air motor and toggle joint;

FIGURE 2 is a top plan view similar to FIGURE 1 but illustrating the cultivator attachment in its inner position after the air motor and toggle joint have been actuated by inward movement of the lever contacting the grape stake.

FIGURE 3 is a side elevational view of the cultivator attachment illustrated in FIGURES 1 and 2;

FIGURE 4 is a sectional view of the cultivator taken on the line 4—4 of FIGURE 2; and FIGURE 5 is a sectional view taken on the line 5—5 of FIGURE 4.

Referring now to the drawings in detail a portion of a conventional tractor 11 is illustrated in FIGURE 1 wherein the framework comprises a longitudinal member such as an I-beam 12 rigidly secured in any suitable manner to the framework or axle of the tractor 11.

If desired the I-beam 12 may be secured to the front and rear axles of the tractor in any suitable manner which is not specifically illustrated herein.

A cantilever bracket 13 is rigidly secured to the I-beam 12 and extends outwardly therefrom just back of the front wheel of the tractor.

An arm 14 is pivotally connected to the cantilever bracket by means of a universal joint 15 and extends rearwardly therefrom being supported at its rearward end by a caster wheel 16 which may be adjusted vertically to vary the depth of cut by means of a set screw.

The arm 14 is also connected by means of a toggle joint 17 to the I-beam 12 for inward and outward movement thereof by a fluid piston and cylinder 18 which is preferably actuated by air through the hoses 19 and 21, and is connected by means of the piston rod 22 to the central portion of the toggle 17.

The hoses 19 and 21 are connected to an air valve 23 which in turn is connected through the hose 24 to a suitable source of compressed air. The air valve 23 may be manually operated by the driver but is preferably actuated automatically by a lever 25 which extends outwardly and rearwardly therefrom forward of the cultivator itself which is mounted within a housing 26.

The cultivator is driven through a chain drive 27 by a suitable motor such as the air motor 28 which is also connected through a hose 29 to a source of compressed air.

In addition to actuating the arm 14 the toggle 17 is also connected through a lever 31 to a rake 32 which is pivotally mounted by the shaft 33 extending through journals 34 and 35.

As illustrated more clearly in FIGURE 3 the lever 31 is connected to an arm 36 on the rake which forms a bell crank for raising and lowering the rake from the position of FIGURE 1 (indicated in phantom lines in FIGURE 3), to the position illustrated in FIGURES 2 and 3.

Referring now in detail to FIGURES 3, 4 and 5 the rotary cultivator itself is mounted within a housing 26 which is provided with downwardly extending arms 37 and 38 between which extends the shaft 39.

The shaft 39 is journaled in suitable bearings 41 and 42 and at its inner end is provided with a chain sprocket 43 which is driven by the chain drive 27 from the motor 28.

A plurality of hoes 44 are mounted in spaced, staggered relation around the cylindrical drum 45 which is rigidly secured as by welding to the shaft 39 by means of the discs 46 and 47.

It will be apparent that the hoes 44 rotate in a counter-clockwise direction as seen in FIGURE 5 or in a clockwise direction as viewed from the outer end of the shaft 39 and indicated in FIGURE 3 so that the sharp pointed ends of the hoes cut through the ground cutting and pulling out the weeds and devil grass and also pulverizing the ground as they go through.

It will be obvious, therefore, that the speed of rotation of the cultivator will have to be at a sufficiently high speed so that the hoes 44 move through the ground much faster than the tractor and the cultivator attachment generally move over the ground.

In the operation of the cultivator of the present invention the cultivator will normally be in its outboard position as illustrated in FIGURE 1 and the rake 32 will be in its downward position as illustrated in phantom lines in FIGURE 3. When the lever 25 strikes a rigid member in its path such as the grape stake 48 it is moved from the position of FIGURE 1 to the position of FIGURE 2 which opens the valve 23 and admits air under pressure through the hose 21 to the lower part of the piston in cylinder 18 moving the piston rod 22 in a forward direction to break the toggle joint 17 and move it to the position illustrated in FIGURE 2 where the cultivator 26 is retracted to a position closely adjacent the rear wheel of the tractor and the rake 32 is moved to its upper position for dumping the debris collected.

As long as the lever 25 is in contact with the grape stake 48 the cultivator will be held in its inner position and the rake in its upper position as illustrated in FIGURE 2. After it is passed the stake 48 the spring 49 resiliently urges the lever 26 to its outermost position as illustrated in FIGURE 1 where it will be in position to strike the next grape stake along the line. In this position the valve will be actuated in the opposite direction to feed air through the hose 19 to the cylinder 18 and move the piston rod 22 to its outermost position locking the toggle 17 in the position illustrated in FIGURE 1, thus moving the cultivator back out to its normal position and lowering the rake 37.

It will be apparent that the cultivator of the present invention will be able to thoroughly cover the ground between adjacent vines or trees in the same row and work in closer to the vine as it passes.

While one specific embodiment of the invention has been disclosed herein, it will be apparent that many variations and modifications may be made within the scope of the following claims.

What is claimed is:

1. A cultivator attachment for tractors comprising a bracket extending outwardly from said tractor, an arm universally mounted on the outer end of said bracket and extending rearwardly therefrom, said arm being swingable between a retracted position alongside said tractor and a laterally extended position, a cultivator rigidly mounted on said arm and extending outwardly therefrom, a rake mounted on said arm rearwardly of said cultivator, said rake being swingable vertically about a horizontal pivot, a cylinder and piston mounted on said bracket, a toggle joint extending between said tractor and said arm, a rod extending between said piston and said toggle joint, and a link connected between said toggle joint and said rake, said link being operable to swing said rake upwardly as said toggle joint is actuated by said cylinder and piston to move said arm from said extended position to said retracted position.

2. A cultivator attachment as set forth in claim 1 wherein a valve is provided connected to said cylinder and a lever is mounted adjacent said valve for actuation thereof, said lever extending outwardly and rearwardly from said valve in front of said cultivator and being engageable by an object in the path thereof, said lever being operable to actuate said valve when engaged by said object as the tractor moves forwardly.

3. A cultivator attachment for tractors comprising a frame work adapted to be rigidly mounted on one side of said tractor, a cantilever bracket extending outwardly from said framework, an arm universally mounted on the outer end of said bracket and extending rearwardly therefrom, said arm being swingable between a retracted position alongside said tractor and a laterally extended position, a rotary hoe-type of cultivator rigidly mounted on said arm and extending outwardly therefrom, a rake mounted on said arm rearwardly of said cultivator, said rake being swingable vertically about a horizontal pivot, a cylinder and piston mounted on said bracket, a toggle joint extending between said framework and said arm, a rod extending between said piston and said toggle joint, and a link connected to said toggle joint and to said rake, said toggle joint being operable to swing said arm and cultivator from said laterally extended position to said retracted position when said cylinder and piston are actuated, and said link being operable to swing said rake upwardly responsive to operation of said toggle joint.

4. A cultivator attachment as set forth in claim 3 wherein a valve is provided connected to said cylinder and a lever is mounted adjacent said valve for actuation thereof, said lever extending outwardly and rearwardly from said valve in front of said cultivator so as to be engageable by an object in the path thereof, said lever being operable to actuate said valve when engaged by said object as the tractor moves forwardly.

5. A cultivator of the class described comprising: a beam adapted to be attached to a tractor; a cantilever bracket rigidly secured to said beam and extending outwardly from said tractor; an arm universally mounted on one of its ends to said bracket and extending rearwardly therefrom relative to the front direction of said tractor; said arm being swingable between a retracted position alongside said tractor and a laterally extended position; a wheel vertically adjustably mounted on the other end of said arm; a toggle joint connected between said beam at a distance from said bracket and said arm at a point intermediate at the ends of said arms; a piston rod connected to the center of said toggle joint; said piston rod being attached to a piston moveably mounted in a cylinder; a source of air pressure connected to the ends of said cylinder; a cultivator comprising a plurality of radially mounted hoes rotatably mounted on said arm at a point intermediate its ends; means connected to said cultivator for rotating the same; a rake mounted on said arm at a distance from said cultivator; said rake being swingable vertically about a horizontal pivot; a lever attached to said rake; a link attached to said lever at one end thereof and attached to said toggle joint at the other end thereof; an air valve operable to control the flow of air from said source to said cylinder; and a lever attached to said air valve and extending laterally therefrom in front of said rotatably mounted hoes; said lever being engageable by an object in the path thereof and being actuated by said object to operate said valve.

6. A cultivator attachment for tractors comprising a bracket extending outwardly from the tractor framework, an arm universally mounted on the outer end of said bracket and extending rearwardly therefrom, said arm being swingable between a retracted position alongside said tractor and a laterally extended position, a cultivator rigidly mounted on said arm and extending outwardly therefrom, a cylinder and piston mounted on said bracket, a toggle joint extending between said tractor framework and said arm, a rod extending between said piston and said toggle joint to actuate the latter, said toggle joint being operable to move said arm between said extended position and said retracted position when the cylinder and piston are actuated, a valve connected to said cylinder, and a lever mounted adjacent said valve for operating the latter, said lever extending outwardly and rearwardly in front of said cultivator so as to be engageable by an object in the path thereof, said lever being operable to actuate said valve upon being engaged by said object.

References Cited in the file of this patent

UNITED STATES PATENTS

| | | |
|---|---|---|
| 1,662,088 | Von Raussendorff | Mar. 13, 1928 |
| 2,253,130 | Lund | Aug. 19, 1941 |
| 2,409,509 | Mott | Oct. 15, 1946 |
| 2,539,864 | Rutherford | Jan. 30, 1951 |
| 2,727,451 | Gohl | Dec. 20, 1955 |
| 2,749,824 | Friday | June 12, 1956 |

FOREIGN PATENTS

| | | |
|---|---|---|
| 163,991 | Australia | July 15, 1954 |
| 1,123,156 | France | June 4, 1956 |